United States Patent [19]

Radlmann et al.

[11] 3,950,311
[45] Apr. 13, 1976

[54] PROCESS FOR THE PREPARATION OF POLYCAPROLACTAM WHICH CAN BE DYED WITH CATIONIC DYES

[75] Inventors: Eduard Radlmann, Dormagen-Hackenbroich; Jürgen Schramm; Günter Nischk, both of Dormagen, all of Germany

[73] Assignee: Bayer Aktiengesellschaft, Leverkusen, Germany

[22] Filed: Mar. 8, 1974

[21] Appl. No.: 449,496

[30] Foreign Application Priority Data
Mar. 10, 1973 Germany............................ 2311982

[52] U.S. Cl........................ 260/78 L; 260/857 TW
[51] Int. Cl.².......................................... C08G 69/16
[58] Field of Search .................................. 260/78 L

[56] References Cited
UNITED STATES PATENTS

| | | | |
|---|---|---|---|
| 3,389,549 | 6/1968 | David.............................. | 260/78 L |
| 3,709,865 | 1/1973 | Lofquist et al................ | 260/78 L X |
| 3,828,009 | 8/1974 | Lofquist.......................... | 260/78 L |

*Primary Examiner*—Lucille M. Phynes
*Attorney, Agent, or Firm*—Plumley & Tyner

[57] ABSTRACT

This invention relates to a process for the preparation of a polycaprolactam which can be dyed with basic dyes and worked up from the melt to form products such as fibers or foils. The polycaprolactams contain structural elements of the formulae

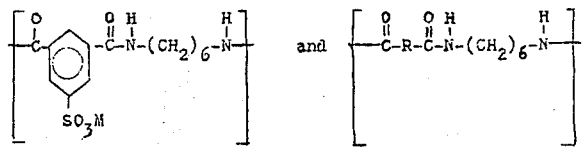

wherein
M denotes an alkali metal and
R denotes an alkylene group containing 4 – 12 carbon atoms.

The process of the production of the polycaprolactams comprises precondensing the alkali metal salt of a dialkyl ester of 5-sulphoisophthalic acid in aqueous solution with an excess of hexamethylene diamine and adding caprolactam and an equivalent quantity based on the hexamethylene diamine excess of an aliphatic dicarboxylic acid to the resulting aqueous precondensate and polycondensing the mixture.

7 Claims, No Drawings

PROCESS FOR THE PREPARATION OF POLYCAPROLACTAM WHICH CAN BE DYED WITH CATIONIC DYES

This invention relates to a process for the preparation of a polycaprolactam which can be dyed with basic dyes and worked up from the melt to form products such as fibers or foils.

It is known that nylon-6,6 can be acid modified by co-condensation of salts of 5-sulphoisophthalic acid and hexamethylene diamine or also N-sulphobutylhexamethylene diamine and adipic acid, succinic acid or sebacic acid and that articles produced from these co-condensates can be dyed with basic dyes (U.S. Pat. Nos. 3,184,436 and 3,454,535). Attempts at acid modification of polycaprolactam by either of these methods fails because these salts are insoluble in caprolactam, precipitate in the polymerisation reactors and spinning apparatus and the preparation and processing of the polymer is quite impractical (DOS No. 2,215,515, page 1, which corresponds to U.S. Ser. No. 130,441).

It is also known that small quantities of salts of N-sulphobutylhexamethylenediamine and azelaic acid or the dimeric acid of oleic acid are soluble in caprolactam, can be condensed with it and considerably reduce the proportion of insoluble component in the polycaprolactam (DOS No. 2,215,515 which corresponds to U.S. Ser. No. 130,441).

A process has now been found by which caprolactam can be polycondensed with up to 44 % by weight of a dialkylester of 5-sulphoisophthalic acid in the form of its alkali metal salt, hexamethylene diamine and an aliphatic dicarboxylic acid to produce completely homogeneous, fusible polycaprolactams which can be shaped from the melt without any interference from insoluble constituents to form articles such as threads or foils which can be dyed with basic dyes. In this new process, the concentration of sulphonate groups can be varied as desired within a wide range so that polycaprolactams with very high concentrations of sulphonate groups, so-called concentrates, become available for the first time. These modified polycaprolactams may be added to unmodified polycaprolactam shortly before the shaping process. Moreover, the process may also be used to prepare polycaprolactams which contain only sufficient sulphonate groups to enable them to absorb dye as required and which can be worked up into threads or foils immediately after polycondensation.

This invention thus relates to a process for the preparation of homogeneous polycaprolactams which contain structural elements of the formulae

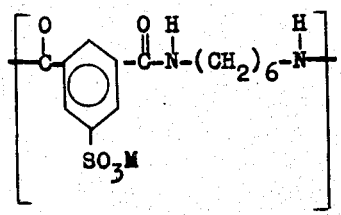 and

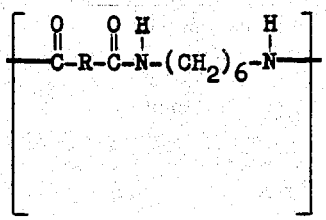

wherein
M denotes an alkali metal and
R denotes an alkylene group containing 4–12 carbon atoms,
which comprises
a. precondensing the alkali metal salt of a dialkyl ester of 5-sulphoisophthalic acid represented by the formula

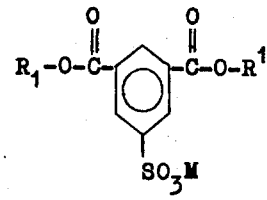

wherein
M has the meaning indicated above and
R denotes an alkyl group containing 1–10 carbon atoms, in aqueous solution with an excess of hexamethylene diamine, preferably using a molar ratio of between 1:2 and 1:4, under a stream of inert gas at temperatures of up to 100°C without excess pressure or at higher temperatures at elevated pressure, and
b. adding caprolactam and an equivalent quantity, based on the hexamethylene diamine excess, or preferably an excess quantity of an aliphatic dicarboxylic acid of the formula

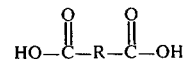

in which
R has the meaning indicated above, preferably adipic acid, to the resulting aqueous precondensate, distilling off the water at a temperature of 100° to 140°C and polycondensing the mixture without solvent at temperatures of 100° to 300°C with exclusion of oxygen in an inert gas atmosphere at pressures of between 20 excess atmospheres and 0.001 Torr.

The alkali metal salt of a dialkyl 5-sulphoisophthalate used for the precondensation according to the invention is preferably the sodium salt of dimethyl 5-sulphoisophthalate and it is used in such a quantity that the concentration of sulphonate groups is 40 to 1500 mval, preferably 80 to 1200 mval per 1000g of polymer. The solids content of the aqueous solution during precondensation is preferably between 20 and 70 %, the condensation time is preferably 3 to 6 hours at 80° to 100°C and the inert gas used is nitrogen.

If the polyamides prepared by this process are to be used directly for spinning, the diamine and dicarboxylic acid must be used in at least equivalent ratio but in order to ensure sufficient resistance to acid dyes it is advisable to use a slight excess of aliphatic dicarboxylic acid right from the start of the process of condensation. This excess may be up to 3 mols percent.

If, however, nylon-6-polyamides which have already been condensed are to be made capable of absorbing basic dyes, low molecular weight polyamides of the form claimed here may be added to these condensed polyamides just before they enter the spinning die. For this purpose it is particularly advantageous to use "concentrates" which have a very high concentration of sulphonate groups because it is then sufficient to add only small quantities which will hardly affect the properties of the original polyamides. When preparing these so-called concentrates, a substantially larger quantity of aliphatic dicarboxylic acid than corresponds to an equivalent ratio of diamine to carboxyl groups should be used because it has been found that if equivalent or only slightly more than equivalent quantities of aliphatic dicarboxylic acids are used, the homogeneous melts obtained are so very viscous that they become difficult to work up after only a short condensation time. It was therefore surprising that polyamide melts which can be extruded to form strands which are subsequently granulated can be obtained if a 3 to 25 mols % excess of dicarboxylic acid is used. The excess of aliphatic dicarboxylic acids used should preferably be within the range of 5 to 15 %. The so-called concentrates obtained in this way can easily be added to unmodified polyamides before the spinning die. The threads and fibres obtained in this way can easily be dyed with basic dyes and have a good resist effect on acid dyes. The polycondensation temperatures employed for the concentrates should be between 230° and 270°C, preferably 240° to 250°C.

The relative solution viscosities $\eta_{rel.}$ given in the following examples were determined on solutions of 1 g of substance in 100 ml of m-cresol at 25°C.

The following Examples are to further illustrate the invention without limiting it.

EXAMPLE 1

154.8 Kg of hexamethylene diamine and 197.4 kg of the sodium salt of dimethyl 5-sulphoisophthalate were added to 360 kg of water in a 2000 liter condensation apparatus. The mixture is refluxed for 3 hours at 90°C with stirring while nitrogen is passed over. It is then cooled to 50°C and 111.8 kg of adipic acid and 278.0 kg of ε-caprolactam are added in portions. The temperature is then gradually raised to 140°C in the course of 3 to 5 hours and the mixture of methanol and water is distilled off. The temperature is then raised to 265°C in the course of 3 to 4 hours. When these conditions have been obtained, the pressure in the reaction mixture is finally reduced to about 10 Torr and condensation is continued for another 1 to 2 hours. The homogeneous melt has such a high viscosity by the end of this time that it would be difficult to extrude it into strands which could be granulated. It is therefore ventilated with nitrogen, and 6.8 kg of adipic acid are added with stirring. The melt is then stirred for another 1 to 2 hours, by the end of which time its melt viscosity is such that it can easily be extruded. The extruded material has a melting range of 160° to 168°C and a relative viscosity $\eta_{rel.} = 1.65$. The sulphonate concentration determined by sulphur analysis is 905 mval per 1000 g of polymer. When 10 % by weight of this concentrate are added to an unmodified polycaprolactam shortly before it is spun, the resulting threads can be deeply dyed with basic dyes, e.g. a dye of the following formula:

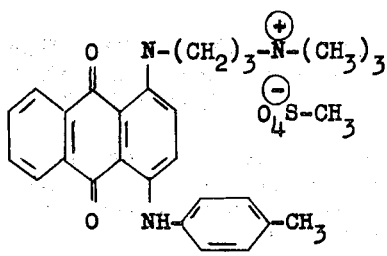

and have excellent resistance to acid dyes.

EXAMPLE 2

58.0 Kg of hexamethylene diamine, 74.0 kg of the sodium salt of dimethyl 5-sulphoisophthalate and 135 kg of water are introduced into a 2000 liter condensation apparatus. The reaction mixture is precondensed by refluxing it at 94°C for 4 hours while nitrogen is passed over. 39.5 kg of adipic acid and 68.5 kg of ε-caprolactam are then added at 60°C and the temperature is gradually raised to 150°C to distil off the methanol and water. The temperature is then further raised to 265°C in the course of 4 hours and only then is the reaction pressure reduced to 5 Torr. After a condensation time of one hour under these conditions, the melt viscosity of the now completely homogeneous melt rises to such an extent that in order to render the melt more easily extrudable it is flushed with nitrogen and 3.0 kg of adipic acid are added before condensation is continued for one or more hour with stirring and under a stream of nitrogen. The melt is then extruded into strands which are then granulated. The homogeneous, colourless concentrate has the following properties:

Melting range: 164°–170°C
Viscosity: $\eta_{rel.} = 1.74$
Sulphonate group content: 1150 mval per 1000 g of polymer.

If 8 % by weight of this concentrate are added to an unmodified nylon-6 before the spinning process, the threads obtained can be deeply dyed with basic dyes, e.g. a dye of the following formula

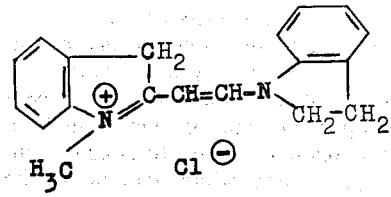

and remain resistant to acid dyes.

EXAMPLE 3

27 Kg of water, 11.60 kg of hexamethylene diamine and 15.40 kg of the lithium salt of diethyl 5-sulphoisophthalate are introduced into a 100 liter condensation apparatus. The mixture is kept under reflux at 95°C for 3 hours under a stream of nitrogen. After precondensation has been completed, 8.76 kg of adipic acid and 19.8 kg of ε-caprolactam are added to the solution and the apparatus is heated to 200°C with stirring after it has been sealed so that the reaction pressure rises to 15 excess atmospheres. After 2 hours under these conditions, the pressure is released in the course of 4 hours, during which time the reaction temperature should not drop below 180°C. The reaction vessel is then flushed with nitrogen, the temperature is raised to 250°C and the pressure is slowly reduced to 3 mm. Condensation is terminated after 3 hours. The melt is extruded and the strands are carried over a drying band and granulated in a granulator attached to it. The homogeneous, colourless concentrate has the following properties:

Melting range: 162°–166°C
Viscosity: $\eta_{rel.} = 1.70$
Sulphonate group content: 1045 mval per 1000 g of polymer.

When 6 % by weight of the concentrate are added to an ordinary, unmodified nylon-6 before it is spun, the resulting threads, and the articles manufactured from them can be dyed to deep colours with basic dyes, e.g. a dye of the following formula:

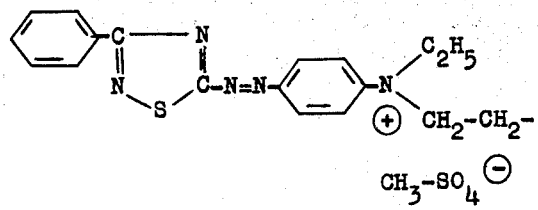

These threads have excellent resistance to acid dyes.

EXAMPLE 4

25.16 Parts by weight of the sodium salt of dimethyl 5-sulphoisophthalate, 19.72 parts by weight of hexamethylene diamine and 46 parts by weight of water are mixed in a polycondensation vessel and refluxed at 95°C for 2 hours with stirring under a stream of nitrogen. 17.70 Parts by weight of sebacic acid and 946.00 parts by weight of caprolactam are then added to the aqueous solution. Methanol and water are distilled off by raising the temperature to 140°C in the course of 3 hours. The condensation temperature is then raised to 250°C with stirring under a stream of nitrogen and the reaction pressure is finally reduced to 15 mm Hg. After a further 2 hours condensation under these conditions, and after it has been flushed with nitrogen, the colourless, homogeneous highly viscous melt is spun to form threads. Excellent dyeings can be obtained on these threads with basic dyes. The threads have the following properties:

Melting range: 208°–212°C
Viscosity: $\eta_{rel.} = 2.48$
Sulphonate group content: 79 mval per 1000 g of polymer.

EXAMPLE 5

35.52 Parts by weight of the sodium salt of dimethyl 5-sulphoisophthalate, 30.16 parts by weight of hexamethylene diamine and 155 parts by weight of water are introduced into a polycondensation apparatus, a stream of nitrogen is passed over the mixture and the mixture is then refluxed for 3 hours with stirring. 32.84 Parts by weight of decane dicarboxylic acid and 914.20 parts by weight of caprolactam are then added to the solution. The solution is then slowly heated to 150°C under a stream of nitrogen to distil off the methanol and water. The temperature is then slowly raised to 250°C and the reaction mixture is condensed under these conditions for 5 hours. Finally, a vacuum is applied for 1.5 hours to reduce the reaction pressure to 15 mm Hg. The highly viscous homogeneous melt then obtained can be spun after it has been flushed with nitrogen. The threads obtained can be dyed to deep colors with basic dyes and have the following properties:

Melting range: 198°–221°C
Viscosity: $\eta_{rel.} = 2.65$
Sulphonate group content: 128 mval per 1000 g of polymer.

We claim:

1. A process for the production of homogenous polycaprolactams having a sulfonate group concentration of from about 40 to about 1500 mval per 1000 grams of polymer, said polycaprolactams further containing structural elements of the formulae:

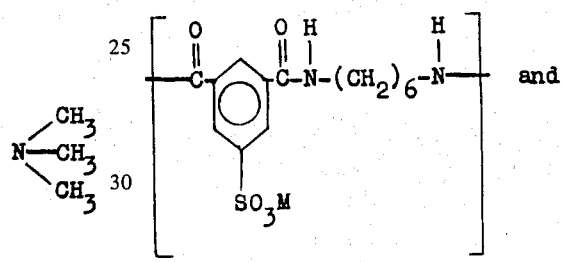 and

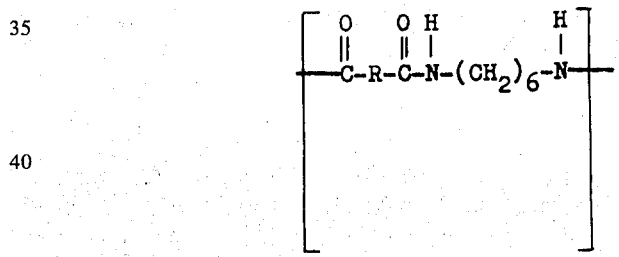

wherein:
M denotes an alkali metal and
R denotes an alkylene group containing 4-12 carbon atoms; which consists essentially of
a. precondensing the alkali metal salt of a dialkyl 5-sulphoisophthalate of the formula

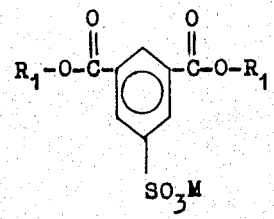

wherein:
M has the meaning indicated above and
R denotes an alkyl group containing 1-10 carbon atoms in aqueous solution with an excess of hexamethylene diamine under a stream of inert gas at temperatures of up to 100°C without pressure or at higher temperatures under pressure, and b. adding caprolactam and, based on the excess of the hexamethylene diamine, an equivalent quantity or preferably a more than equivalent quantity of an aliphatic dicarboxylic acid of the formula

wherein:

R has the meaning indicated above, to the resulting aqueous precondensate, distilling off the water at a temperature of 100° to 140°C and polycondensing the mixture in the melt at temperatures of 100° to 300°C with exclusion of oxygen in an inert gas atmosphere at pressures between 20 excess atmospheres and 0.001 Torr.

2. The process according to claim 1, wherein the dialkyl 5-sulphoisophthalate is precondensed in aqueous solution with a hexamethylene diamine excess in a molar ratio of between 1:2 and 1:4.

3. The process according to claim 1, wherein the dicarboxylic acid is added in a 3 to 25 mols % excess, based on hexamethylene diamine.

4. The process according to claim 1, wherein the dicarboxylic acid is added in a 5 to 15 mols % excess, based on hexamethylene diamine.

5. The process according to claim 1, wherein the dicarboxylic acid is added in an excess of up to 3 mols %, based on hexamethylene diamine.

6. The process according to claim 1, wherein the dicarboxylic acid added is adipic acid.

7. Threads and fibres of polycaprolactams which contain, as mixtures, up to 20 % by weight of the polymers prepared according to claim 1.

* * * * *